United States Patent
Burkert et al.

(10) Patent No.: US 10,416,478 B2
(45) Date of Patent: Sep. 17, 2019

(54) CONTROLLING A LENS FOR ADJUSTABLE VISION CORRECTION

(71) Applicant: Telefonaktiebolaget LM Ericsson (publ), Stockholm (SE)

(72) Inventors: Till Burkert, Huddinge (SE); Julian Charles Nolan, Pully (CH); Matthew John Lawrenson, Bussigny (CH); Lars Andersson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 15/894,503

(22) Filed: Feb. 12, 2018

(65) Prior Publication Data

US 2018/0173014 A1 Jun. 21, 2018

Related U.S. Application Data

(63) Continuation of application No. 14/770,380, filed as application No. PCT/SE2015/050766 on Jun. 30, 2015, now Pat. No. 9,971,170.

(51) Int. Cl.
*G02C 7/08* (2006.01)
*G02C 7/06* (2006.01)

(52) U.S. Cl.
CPC ............... *G02C 7/083* (2013.01); *G02C 7/06* (2013.01)

(58) Field of Classification Search
CPC .................................. G02C 7/083; G02C 7/06
See application file for complete search history.

(56) References Cited

U.S. PATENT DOCUMENTS

| | | |
|---|---|---|
| 5,359,444 A | 10/1994 | Piosenka et al. |
| 6,517,203 B1 | 2/2003 | Blum et al. |
| 6,619,799 B1 | 9/2003 | Blum et al. |
| 7,656,509 B2 | 2/2010 | Haddock et al. |
| 8,690,321 B2 | 4/2014 | Blum et al. |
| 9,274,351 B2 | 3/2016 | Drobe |
| 2013/0278889 A1 | 10/2013 | Lapstun |

FOREIGN PATENT DOCUMENTS

| | | |
|---|---|---|
| CN | 1372650 A | 10/2002 |
| CN | 102846305 A | 1/2013 |
| CN | 104020584 A | 9/2014 |

(Continued)

OTHER PUBLICATIONS

Office Action for Chinese Patent Application No. 201580081325.X dated Dec. 10, 2018, 10 pages including English translation.

(Continued)

*Primary Examiner* — Jack Dinh
(74) *Attorney, Agent, or Firm* — Sage Patent Group

(57) ABSTRACT

A device for controlling a lens for adjustable vision correction is provided. The device, e.g., a smartphone, comprises circuits to determine if a user of the device is gazing at the device, and, if the user is gazing at the device, to determine a distance between the eye and the device, and to control the lens to adjust its focal length based on the determined distance. Thereby, the lens is adjusted only if required, i.e., if the user is gazing at the device. The circuits may be suitable for correcting presbyopia if the user is gazing at a device located at close distance, and alleviate the need for the user to actively operate a switch or move her head for adjusting the focal length of her lenses.

20 Claims, 6 Drawing Sheets

(56) References Cited

FOREIGN PATENT DOCUMENTS

EP          2 693 260 A1     2/2014
EP          2 706 396 A1     3/2014

OTHER PUBLICATIONS

International Search Report and Written Opinion of the International Searching Authority, Application No. PCT/SE2015/050766, dated Mar. 3, 2016.

Hennessey et al., "Noncontact Binocular Eye-Gaze Tracking for Point-of-Gaze Estimation in Three Dimensions", *IEEE Transactions on Biomedical Engineering*, vol. 56, No. 3, Mar. 2009, pp. 790-799.

Milton et al., "Electronic liquid crystal contact lenses for the correction of presbyopia", *Optics Express*, vol. 22, No. 7, Apr. 7, 2014, pp. 8035-8040.

Ren et al., "Liquid crystal lens with large focal length tunability and low operating voltage", Optics Express, vol. 15, No. 18, Sep. 3, 2017, pp. 11328-11335.

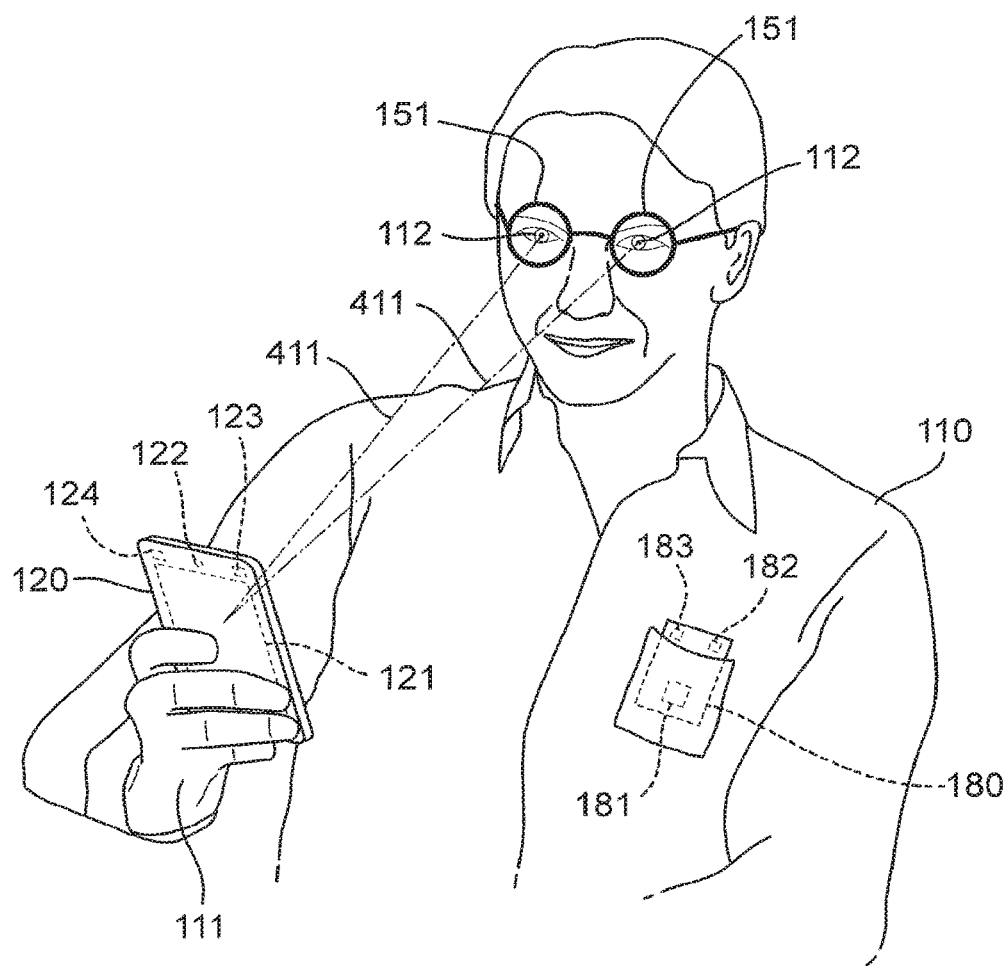

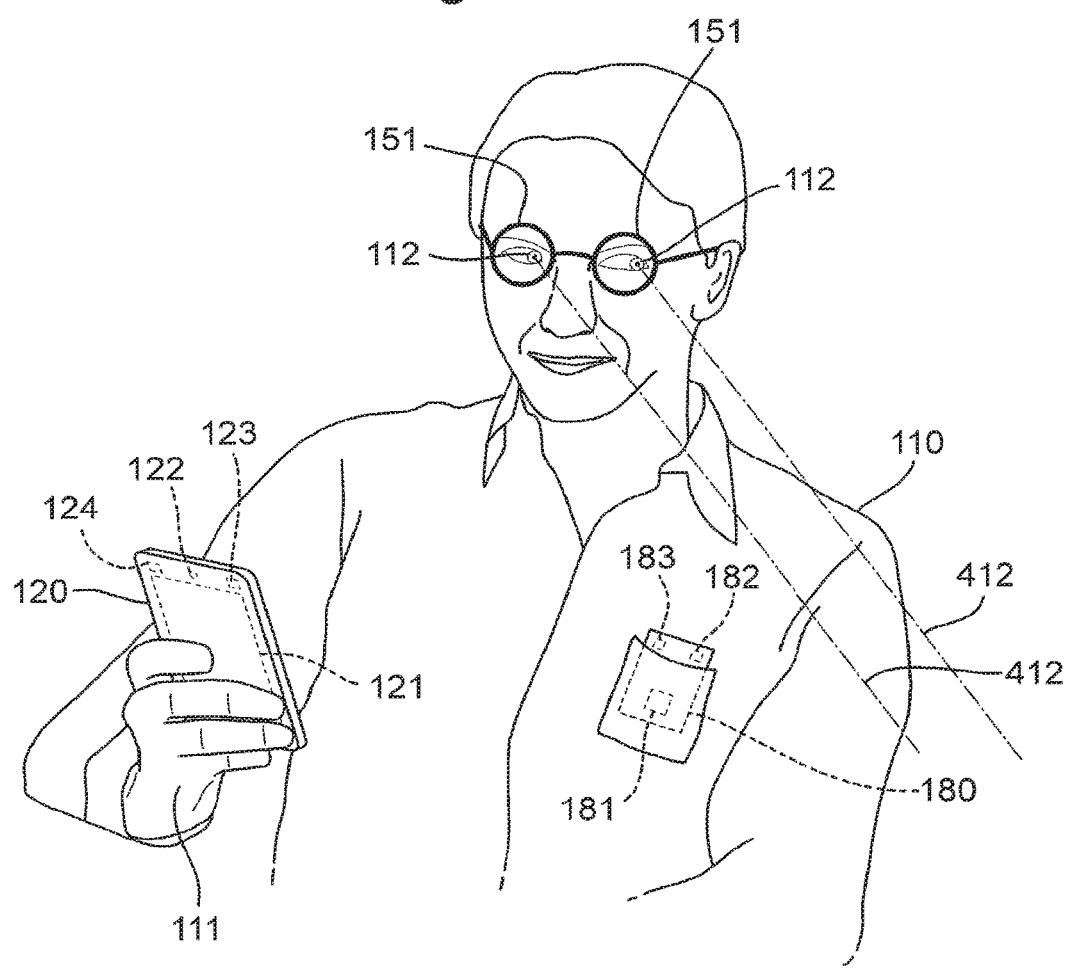

CONTROLLING A LENS FOR ADJUSTABLE VISION CORRECTION

CROSS REFERENCE TO RELATED APPLICATIONS

This application is a continuation of U.S. patent application Ser. No. 14/770,380, filed on Aug. 25, 2015, which itself is a 35 U.S.C. § 371 national stage application of PCT International Application No. PCT/SE2015/050766, filed on Jun. 30, 2015, the disclosure and content of which is incorporated by reference herein in its entirety.

TECHNICAL FIELD

The invention relates to a device for controlling at least one lens for adjustable vision correction worn in front of an eye of a user of the device, a method thereof, a corresponding computer program, and a corresponding computer program product.

BACKGROUND

Presbyopia, short-sightedness brought on by aging, is very common and applies to most of the population of age over 45 years. When working optimally, the human eye can focus on objects ranging from around 25 cm away to infinity. This is accomplished by the ciliary muscles changing the shape of the lens inside the eye to maintain the focus of the image onto the retina for objects at different distances. During aging the ciliary muscles suffer from a reduced ability to deform the lens and the eye progressively loses the ability to focus on closer objects.

Presbyopia has traditionally been addressed by using additional lenses in front of the eye, such as a pair of 'reading glasses' which are used when looking at close objects, or additional lenses integrated into an existing pair of glasses, such as 'bifocals' or 'varifocals'. These additional lenses can be used by glancing down.

More recently, liquid-crystal technology, allowing for a controllable change in refractive index by applying an electric field, has been introduced for glasses and contact lenses (see, e.g., "Liquid crystal lens with large focal length tunability and low operating voltage", by H. Ren, D. W. Fox, B. Wu, and S. T. Wu, Optics Express, Vol. 15, Issue 18, pp. 11328-35, OSA Publishing, 2007; "Electronic liquid crystal contact lenses for the correction of presbyopia", by H. E. Milton, P. B. Morgan, J. H. Clamp, and H. F. Gleeson, Optics Express, Vol. 22, Issue 7, pp. 8035-8040, OSA Publishing, 2014). This allows a controllable change in the optical properties of a lens by application of a voltage or current. Such lenses may be controlled either by a manual switch or by utilizing an orientation sensor detecting when a person wearing the lenses is moving her head, as is described in U.S. Pat. No. 6,517,203 B1.

In U.S. Pat. No. 7,656,509 B2 devices for determining a distance of an object a user of an electro-active lens is looking at are presented. The optical power of the electro-active lens may be altered based on the determined distance to ensure that the object is correctly focused, without requiring the user to operate a switch, glance down, or dip her head.

SUMMARY

It is an object of the invention to provide an improved alternative to the above techniques and prior art.

More specifically, it is an object of the invention to provide an improved solution for controlling a lens for adjustable vision correction worn in front of an eye of a user of a device, such as a mobile phone, a smartphone, a mobile terminal, a tablet, an e-book reader, a computer screen, or a television set.

These and other objects of the invention are achieved by means of different aspects of the invention, as defined by the independent claims. Embodiments of the invention are characterized by the dependent claims.

According to a first aspect of the invention, a device for controlling at least one lens is provided. The lens is suitable for adjustable vision correction if worn in front of an eye of a user of the device. The device comprises means which are operative to determine if the user is gazing at the device. The means are further operative, if the user is gazing at the device, to determine a distance between the eye and the device, and to control the at least one lens to adjust its focal length based on the determined distance.

According to a second aspect of the invention, a method of a device for controlling at least one lens is provided. The lens is suitable for adjustable vision correction if worn in front of an eye of a user of the device. The method comprises determining if the user is gazing at the device. The method further comprises, if the user is gazing at the device, determining a distance between the eye and the device, and controlling the at least one lens to adjust its focal length based on the determined distance.

According to a third aspect of the invention, a computer program is provided. The computer program comprises computer-executable instructions for causing a device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

Throughout the present disclosure, the at least one lens is either one or two contact lenses, or one or two lenses of a pair of glasses. The optical properties of the lens can be adjusted in a controllable manner. In particular, the index of refraction of at least a part of the lens may be adjusted by applying an electric field, a voltage, or an electric current. Thereby, the focal length of the part of the lens can be adjusted.

Focal length is measured in meters, and is the inverse of optical power, also known as focal power, dioptric power, refractive power, focusing power, or convergence power.

Lenses which have an electrically controllable focal length are commonly referred to as electro-active lenses and may, e.g., be based on liquid-crystal technology, as is known in the art. The lens may be controlled to adjust its focal length by switching between two or more states having different focal lengths. Alternatively, the focal length of the lens may be continuously adjustable.

The invention makes use of an understanding that lenses for adjustable vision correction, such as electro-active lenses, worn by a user may be controlled by a device which is associated with the user. In particular, the device may be a device which the user is frequently or occasionally gazing at, such as a mobile phone, a smartphone, a mobile terminal, a tablet, an e-book reader, a computer screen, or a television set. Typically, such devices are located at a distance from the user which would necessitate the use of additional lenses, such as reading glasses, bifocals, or varifocals, or actively setting electro-active lenses worn by the user to a mode which is suitable for a near-vision regime of the eye of the user, e.g., if the user is suffering from presbyopia.

Embodiments of the invention are advantageous in that electro-active lenses worn by the user are automatically controlled to adjust their focal length to values which are suitable for correctly focusing on the device if the user is gazing at the device. Embodiments of the invention may, e.g., be utilized for correcting presbyopia by compensating the lack of ability to focus on closer objects if the user is gazing at a device located at close distance. This is achieved by the device determining if the user is gazing at the device. If the user is gazing at the device, the distance between the eye and the device is determined, and the electro-active lens or lenses are controlled to adjust its/their focal length based on the determined distance. In other words, the lenses worn by the user are only adjusted if required, i.e., if the user is gazing at the device. Embodiments of the invention alleviate the need for the user to actively operate a switch or move her head for adjusting the focal length of her lenses.

The solution described herein is advantageous over the known electro-active lenses which are adjusted based on a distance to an object the user is looking at which is determined by a range finder which is integrated with the lenses. This is the case since lenses which are used together with embodiments of the invention are lighter and can be manufactured at lower cost, since range-finding devices are rather complex, and often too complex to be integrated with contact lenses. In other words, rather than integrating range-finding and/or gaze detection capabilities with electro-active lenses, either within a contact lens or into the frame of glasses, embodiments of the invention rely on a device which the user is gazing at. This is particularly advantageous for devices which are operated and/or held by a hand of the user, since the distance between the eye and the device is limited by the user's anatomy, i.e., the user's arm.

According to an embodiment of the invention, the at least one lens is controlled to adjust its focal length further based on information pertaining to an eye disease or an eye condition of the user, such as presbyopia, long-sightedness (hyperopia), or short-sightedness (myopia). Such information may be obtained from the user's optician prescription, medical records, a database maintained by a lens manufacturer, or the like. The information may be provided by the user, retrieved over the Internet, or received from the lens, e.g., over a communication link between the device and the lens. In order to retrieve the information, the lens, a batch of lenses, and/or the user, is/are preferably identified in a request for retrieving the information. The information may also relate to a threshold distance which is representative of a transition between a near-vision regime and a far-vision regime of the eye of the user, as is described below.

According to an embodiment of the invention, the determined distance is compared to a threshold distance which is representative of a transition between a near-vision regime and a far-vision regime of the eye. Presbyopia, e.g., becomes prominent in the near-vision regime. The at least one lens is controlled to adjust its focal length to a focal length suitable for the near-vision regime if the determined distance is below the threshold distance. Optionally, the at least one lens is controlled to adjust its focal length to a focal length suitable for the far-vision regime if the determined distance is equal to or above the threshold distance. Controlling the lens to switch between a near-vision regime and a far-vision regime is particularly suitable for lenses which are switchable between two different focal lengths. For instance, the focal length of the known liquid-crystal based lenses is decreased when activated, making them suitable for correcting presbyopia in the activated state.

The threshold distance may be configured by the user, in accordance with properties of the lens, e.g., as recommended by the lens manufacturer, or based on the user's optician prescription. As an alternative, the threshold distance may also be learned by detecting the distance at which the user is holding the device so as to read more comfortably. For instance, the device may detect that the user is extending her arm every time she reads text with small font size. It will also be appreciated that an emerging condition of presbyopia may be detected by the device based on detecting that the user is extending her arm when trying to read small text, and at which distance the device is held. If the distance is gradually increasing over time, an emerging condition of presbyopia is likely and the user may optionally be notified.

According to an embodiment of the invention, if the user is not gazing at the device, the at least one lens is controlled to adjust its focal length to a focal length suitable for a far-vision regime of the eye. In other words, if the user is not gazing at the device, it is assumed that she is gazing at an object at a distance which is commensurate with the far-vision regime. For instance, the known liquid-crystal based lens is suitable for the far-vision regime when inactivated.

According to an embodiment of the invention, the distance between the eye and the device is determined by detecting that the device is held and/or operated by a hand of the user, and determining the distance based on an anatomy of the user. That is, the distance is inferred based on the understanding that the user's anatomy, in particular the length of her arm, and her habit of holding the device, limit the distance between the eye and the device to a certain range. Optionally, if the thereby determined distance is below a threshold distance which is representative of a transition between a near-vision regime and a far-vision regime of the eye, as is described hereinbefore, the lens may be controlled to adjust its focal length to a focal length suitable for the near-vision regime in response to detecting that the device is held and/or operated by a hand of the user. Advantageously, detecting that the device is held and/or operated by a hand of the user is less complex than determining the distance using solutions which are based on structured light, time-of-flight cameras, image processing with perspective scaling, or other types of range-finding devices, which are described further below.

According to an embodiment of the invention, it is determined that the user is gazing at the device if the device is operated by a hand of the user. That is, if the user is touching the touchscreen of a smartphone or pressing buttons on a mobile phone, it is inferred that she is gazing at the device. Advantageously, detecting that the user is operating the device with a hand is less complex than other solutions for gaze detection or eye tracking, such as image processing, which are described further below.

According to an embodiment of the invention, the user, the lens, or both, are identified. This is advantageous since the user may require an assurance that only a device which is under her control is able to control the lenses she is wearing. Thereby, it is avoided that any nearby device, such as a friend's television or a tablet operated by a person sitting next to the user, controls the user's lenses. The user may be identified based on face recognition, i.e., by image processing an image acquired by a camera, e.g., a front-facing camera of a smartphone or tablet. The lens may be identified by wirelessly retrieving information from the lens over a communication link. For instance, the lens may transmit an identifier to the device, such as an identifier of the lens, a batch of lenses, or information identifying the user to which the lens is prescribed. Instead of, or in addition to, information identifying the lens, the device may receive information pertaining to optical properties of the lens from the lens. Optionally, the lens is controlled to adjust its focal length only if the user and/or the lens are successfully identified.

According to an embodiment of the invention, if the user is not gazing at the device, an object in the surroundings of the device at which the user is gazing is determined, a distance between the eye and the object is determined, and the at least one lens is controlled to adjust its focal length based on the determined distance. This may be achieved based on any known means of gaze detection, eye tracking, and range finding, which are elucidated further below. Advantageously, the device, e.g., smartphone, mobile terminal, tablet, or the like, may be utilized for controlling the lens or lenses worn by the user even if she is not gazing at the device, but rather at an object, such as a television set, a person, a wall, and so forth.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIGS. 4a and 4b show a device for controlling a lens for adjustable vision correction, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
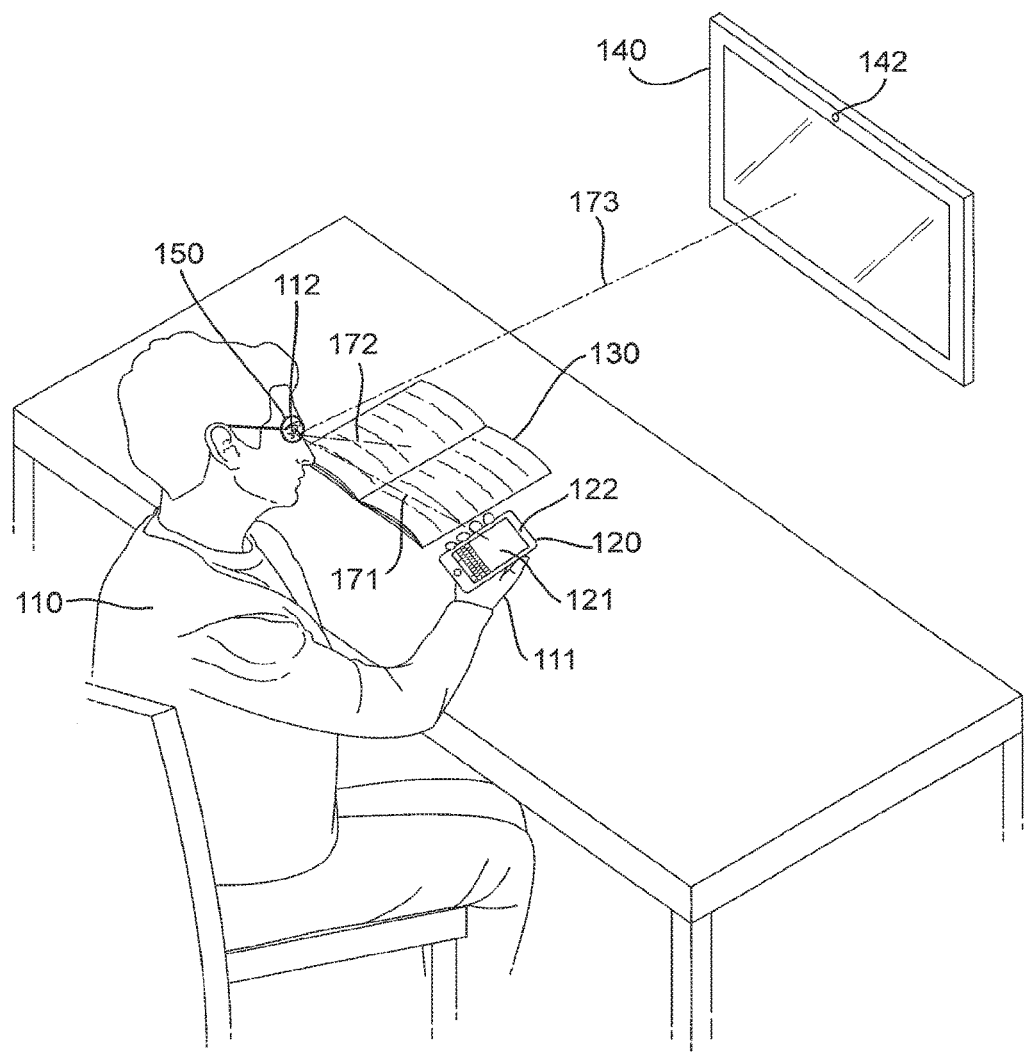
FIG. 1 illustrates a user gazing at different objects, in accordance with embodiments of the invention.

FIG. 1 illustrates a user 110 gazing at different objects and devices. For instance, user 110 may gaze 171 at her smartphone 120 to read a webpage or type an email. Alternatively, user 110 may gaze 172 at a book 120 she is reading, of she may gaze 173 at a television set 140. User 110 is illustrated as wearing glasses 150 in front of her eyes 112, e.g., for correcting an eye disease or an eye condition such as presbyopia, long-sightedness (hyperopia), short-sightedness (myopia), or the like.

Figure 2:
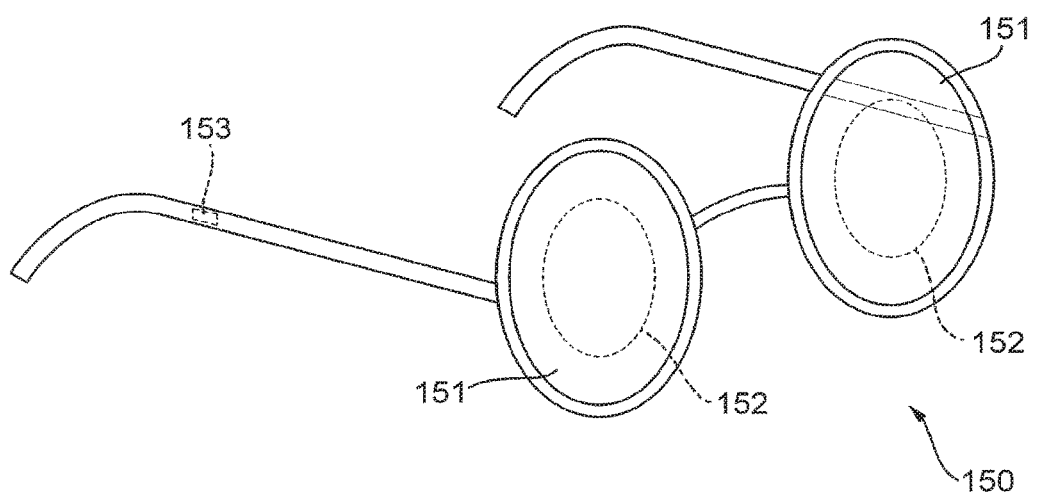
FIG. 2 illustrates glasses for adjustable vision correction, in accordance with embodiments of the invention.

With reference to FIG. 2, illustrating glasses 150 in further detail, it is assumed here that at least one of the lenses 151 comprised in glasses 150 has an adjustable focal length within at least a part 152 of lens 151. Lenses having an adjustable focal length are also known as electro-active lenses and may, e.g., be based on a liquid-crystal layer which is provided on an underlying lens having focal length $f_0$. When activated, using an electric field, a voltage, or an electric current, which is applied over or passed through the liquid-crystal layer, the focal length of lens 151 is adjusted to a value $f_0+\Delta f$, where the change in focal length $\Delta f$ is due to a change in refractive index of the liquid-crystal layer. As an example, lens 151 may comprise a liquid-crystal layer such that, when the liquid-crystal layer is activated by applying an electric field, a voltage, or passing an electric current, the focal length $f_0+\Delta f$ is decreased from its value $f_0$ in the inactive state. Thereby, lens 151 is suitable for correcting presbyopia when activated.

Figure 3:
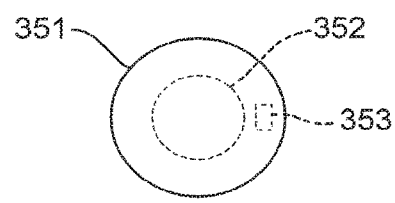
FIG. 3 illustrates a contact lens for adjustable vision correction, in accordance with embodiments of the invention.

It will be appreciated that embodiments of the invention are not limited to liquid-crystal based lenses. On the contrary, embodiments of the invention may utilize any type of lens having a controllable focal length. Moreover, as an alternative to glasses 150 comprising lenses 151, embodiments of the invention may also utilize electro-active contact lenses 351 having an adjustable focal length within at least a part 352 of contact lens 351, as is illustrated in FIG. 3.

Further with reference to FIG. 2, glasses 150 are illustrated as comprising a lens control unit 153 which is integrated into a frame of glasses 150. Lens control unit 153 is operative to receive a control signal transmitted by a device for controlling at least one lens for adjustable vision correction, in accordance with an embodiment of the invention, or a remote control unit 180, as is described below. It will be appreciated that lens control unit 153 may comprise analog or digital electronic circuitry, or a combination therefor, depending on the technology used for transmitting and receiving the control signal. Lens control unit 153 may alternatively be integrated into lens or lenses 151, similar to lens control unit 353 which is integrated into contact lens 351 shown in FIG. 3.

In the following, embodiments of the device for controlling at least one lens for adjustable vision correction worn in front of an eye of a user of the device are described, with further reference to FIGS. 4a and 4b in which device 120 is exemplified as a smartphone. For the sake of simplicity, embodiments of the invention are described as controlling one lens 151 of glasses 150, but corresponding embodiments for controlling both lenses 151 of glasses 150, or one or two contact lenses 351, may easily be envisaged.

In FIG. 4a, user 110 is illustrated as holding and operating device 120 with a hand 111. Device 120 comprises a display 121, such as a touchscreen, at which user 110 is gazing 411, and a processing module 123, which is described in further detail below with reference to FIGS. 6 and 7.

Device 120 is operative to determine if user 110 is gazing 411 at device 120. If it is determined that user 110 is gazing 411 at device 120, a distance between the eyes 112 of user 110 and device 120 is determined, and lens 151 is controlled to adjust its focal length based on the determined distance. For the sake of clarification, it is noted that the distance between eyes 112 and device 120 corresponds to the length of dashed lines 411 illustrated in FIG. 4a.

Device 120 may be operative to determine if user 110 is gazing at device 120 in a number of ways. For instance, device 120 may comprise a front-facing camera 122 and processing module 123 which is operative to acquire an image from camera 122, and to determine if user 110 is gazing 411 at device 120 based on image processing, as is known in the art (see, e.g., "Noncontact Binocular Eye-Gaze Tracking for Point-of-Gaze Estimation in Three Dimensions", by C. Hennessey and P. Lawrence, IEEE Transactions on Biomedical Engineering, Vol. 56, No. 3, March 2009). As an alternative, the gaze of eyes 112 may be determined based on any other known eye-tracking technique, e.g., by detecting infrared light which is reflected from eyes 112 and sensed by a camera 122, by tracking the corneal reflection (the first Purkinje image) and the center of the pupils of eyes 112 over time, utilizing images which are periodically acquired from camera 122, or by tracking reflections from the front of the cornea (first Purkinje image) and the back of the lens (fourth Purkinje image) of eyes 112 over time.

As a further alternative, device 120 may be operative to determine that user 110 is gazing 411 at device 120 if it is detected that device 120 is operated by user 110. For instance, it may be detected that a finger of hand 111, or another finger, is touching touchscreen 121, or a button which device 120 is provided with (not shown in FIG. 4a). In other words, it is inferred that user 110 is likely to gaze 411 at device 120 while actively operating it.

Device 120 may be operative to determine the distance between eyes 112 and device 120 utilizing a number of different techniques. For instance, device 120 may be operative to determine the distance by using structured light, i.e., by projecting a known pattern of light, and by detecting light which is reflected by objects in the surroundings, such as the head, face, or eyes 112 of user 110. This can be achieved imperceptibly to user 110 by utilizing infrared light. As an alternative, device 120 may be provided with a time-of-flight camera 122 which is capable of measuring the time-of-flight of light emitted by device 120 and which is reflected by the head, face, or eyes 112, of user 110 and detected by camera 122. Another alternative for determining the distance between eyes 112 and device 120 is image processing combined with perspective scaling. In addition, techniques which are used for gesture recognition, such as Microsoft's Kinect and Intel's RealSense, or radio-frequency radars such as Google's Soli, may be utilized.

As yet a further alternative, the distance between eyes 112 and device 120 may be determined by detecting that device 120 is held and/or operated by a hand of user 110, e.g., hand 111, and determining the distance based on user 110's anatomy, such as the length of user 110's arm and optionally her habit of holding device 120. Advantageously, this is less complex than the solutions described above, and may be achieved by utilizing touchscreen 121 or any other touch- or pressure-sensitive surface of device 120. Optionally, device 120 may utilize a default value distance for the distance between eyes 112 and device 120 if it is detected that device 120 is held and/or operated by a hand of user 110. Such a default value may, e.g., be configured by user 110. Using a default value for the distance between eyes 112 and device 120 is particularly advantageous if that distance is below a threshold distance which is representative of a transition between a near-vision regime and a far-vision regime of eye or eyes 112, as is described further below. In such case, device 120 may be operative to control lens 151 to adjust to a focal length suitable for the near-vision regime of eye(s) 112, in response to detecting that user 110 is gazing 411 at device 120, without determining the distance based on an actual measurement using one of the techniques described above.

Device 120 is further operative to, subsequent to determining the distance between eyes 112 and device 120, either by measuring the distance or by inferring the distance based on detecting that device 120 is held and/or operated by a hand of user 110, to control lens 151 to adjust its focal length based on the determined distance. Lens 151 may be controlled to adjust its focal length by switching between at least two states having different focal lengths. Alternatively, the focal length of lens 151 may be continuously adjustable.

Device 120 may additionally be operative to adjust the focal length of lens 151 further based on information pertaining to an eye disease or an eye condition of user 110, such as presbyopia. An example of such information is, e.g., a threshold distance which is representative of a transition between a near-vision regime and a far-vision regime of eye or eyes 112, or information which is obtained from user 110's optician prescription. The information may be provided by user 110, received from lens 151 via a wireless communication link, or retrieved over the Internet, e.g., from a database provided by the lens manufacturer. In order to retrieve the information from the database, lens 151, a batch of lenses, or user 110, is preferably identified in the request for retrieving the information.

Device 120 may further be operative to compare the determined distance to the threshold distance which is representative of a transition between a near-vision regime and a far-vision regime of eye(s) 112. In this case, lens 151 is controlled to adjust its focal length to a focal length suitable for the near-vision regime if the determined distance is below the threshold distance, since presbyopia becomes prominent in the near-vision regime. Controlling lens 151 to switch between a near-vision regime and a far-vision regime is particularly suitable for electro-active lenses which are switchable between two different focal lengths. For instance, the focal length of the known liquid-crystal based lenses described above is decreased when activated, making them suitable for correcting presbyopia in the activated state.

The threshold distance may be configured by user 110 in accordance with properties of lens 151, e.g., as recommended by the lens manufacturer or based on user 110's optician prescription. As an alternative, the threshold distance may also be learned by detecting the distance at which user 110 is holding device 120 so as to read more comfortably. For instance, device 120 may be operative to detect that user 110 is extending her arm every time she reads text with small font size, and to determine the distance between eyes 112 and device 120 when adjusted for comfortable reading. This may also be utilized for detecting an emerging condition of presbyopia, if the thereby determined distance is gradually increasing over time. In such case, user 110 may be notified that she is likely to suffer from presbyopia.

Optionally, device 120 may additionally be operative to control lens 151 to adjust its focal length to a focal length suitable for the far-vision regime, if the determined distance is equal to or above the threshold distance. This may, e.g., be the case if device 120 is located at a greater distance from user 110, such as a tablet placed on a table in front of user 110, or the television set 140 illustrated in FIG. 1.

Device 120 may further be operative to control lens 151 to adjust its focal length to a focal length suitable for a far-vision regime of eye(s) 112, if the user is not gazing at device 120, as is illustrated in FIG. 4*b*. That is, if user 110 is not gazing at device 120, it is assumed that she is gazing 412 at an object at a distance which is commensurate with the far-vision regime of eye(s) 112. For the liquid-crystal based lens described above, the far-vision regime corresponds to an inactive state of the liquid-crystal layer.

The focal length suitable for a near-vision regime of eye 112, and the focal length suitable for a far-vision regime of eye 112, respectively, may be pre-determined values configured by user 110, a lens manufacturer, or derived from user 110's optician prescription. In particular, the respective values of the focal length for the near-vision regime and the far-vision regime may correspond to two distinct focal lengths supported by lens 151.

Device 120 may be operative to control lens 151 to adjust its focal length by transmitting a control signal. The control signal may, e.g., be transmitted by a radio module 124 supporting a wireless communication technology such as Bluetooth, Wireless Local Area Network (WLAN)/WiFi, or a cellular standard, in particular according to 3rd Generation Partnership Project (3GPP) technical specifications. As an alternative, radio module 124 may utilize a near-field technology such as Radio-Frequency IDentification (RFID). As yet a further alternative, device 120 may be operative to emit coded light, in particular visible coded light using display 121. A communication link established between radio module 124 and lens 151, or lens control unit 153, may also be utilized for exchanging information identifying user 110 and/or lens 151, or information pertaining to the optical properties of lens 151.

The control signal may be transmitted as a message containing one or more information elements. The control signal, the message, or the one or more information elements, may comprise information representative of at least one of the determined distance, a target focal length for lens 151, and a target state of at least two states of lens 151 which have different focal lengths. Alternatively, the control signal may toggle lens 151 between two states having different focal lengths, e.g., between an inactive state and an active state. Radio module 124 may also be operative to transmit control signals of different frequency, wherein each frequency is associated with one of at least two states of lens 151. Even further, lens 151 may be operative to assume a first state, e.g., an inactive state of the liquid-crystal layer, if the control signal is not received, and a second state, e.g., an active state of the liquid-crystal layer, if the control signal is received. In this case, device 120 may, e.g., be operative to transmit the control signal, via radio module 124, for controlling lens 151 to assume a state having a focal length which is commensurate with the near-vision regime of eye(s) 112 as long as user 110 is gazing at device 120, if it is determined that the distance is below the threshold distance. Advantageously, the electric potential, voltage, or current, which is required for activating lens 151 may be harvested from the received control signal, as is known in the art of RFID.

As an alternative, rather than transmitting the control signal directly to lens control unit 153 comprised in glasses 150, or lens control unit 353 comprised in contact lens 351, respectively, the control signal may be transmitted to a remote control unit 180 worn by user 110. Remote control unit 180 comprises processing module 181, a first radio module 182 for communicating with device 120, and a second radio module 183 for communicating with lens 151. Remote control unit 180 is operative to control lens 151 based on the control signal received via first radio module 182 by transmitting a second control signal via second radio module 183. Using remote control unit 180 for controlling the focal length of lens 151 is advantageous in that it may be located closer to lens 151 than device 120, facilitating usage of short-ranged technologies like RFID for controlling lens 151 by means of the second control signal. Thereby, the power received by lens control unit 153 may be increased, which is advantageous for embodiments relying on energy harvested from the received control signal for activating lens 151.

The functionality described herein may also be divided between device 120 and remote control unit 180. For instance, device 120 may be operative to only transmit the determined distance, and remote control unit 180 may be operative to compare the determined distance to a threshold distance, and so forth. In other words, remote control unit 180 may receive information which is independent from the optical properties of lens 151, and/or eye conditions of user 110, and generate the second control signal based on the optical properties of lens 151 and/or information about the eye condition of user 110.

Further with reference to FIG. 4*b*, if it is detected that user 110 is not gazing at device 120, but gazing 412 into a different direction, device 120 may further be operative to determine an object in the surroundings of device 120 at which user 110 is gazing, determine a distance between eyes 120 and the object, and control lens 151 to adjust its focal length based on the determined distance. For instance, as is illustrated in FIG. 1, device 120 may detect that user 110 is gazing 172 at book 130, or gazing 173 at television set 140.

Even though embodiments of the device for controlling at least one lens for adjustable vision correction have been described in relation to smartphone 120 illustrated in FIG. 1, it will be appreciated that corresponding embodiments may be envisaged for other types of devices, such as mobile phones, mobile terminals, tablets, e-book readers, computer screens, or television sets, e.g., television set 140.

If user 110 has several devices, such as smartphone 120 and television set 140, they may either independently of each other or cooperatively control lens 151. For instance, each of the devices may independently send a control signal to lens 151 if it has detected that user 110 is gazing at it. As an alternative, the devices may cooperatively determine the object which user 110 is gazing at, and/or the distance between eyes 112 and the object. The distance may, e.g., be determined based on a 3D image which is generated from 2D images captured by cameras which the devices are provided with, e.g., front-facing camera 122 of smartphone 120 and camera 142 of television set 140. Alternatively, one or more of the devices may be operative to emit structured light and detect light reflected from objects in the surroundings. As yet a further alternative, device 120 may also comprise a rear-facing camera in addition to front-facing camera 122, and may determine an object which user 110 is gazing at, and the distance between eyes 112 and the object, by image processing images captured by front-facing camera 122 and the rear-facing camera.

In a scenario involving several devices, one of the devices, e.g., smartphone 120, may have the role of a master device which transmits the control signal to lens 151 based on information, such as distance to one or more objects, a gaze of eyes 112, or images, received from other devices, e.g., from television set 140.

Figure 5:
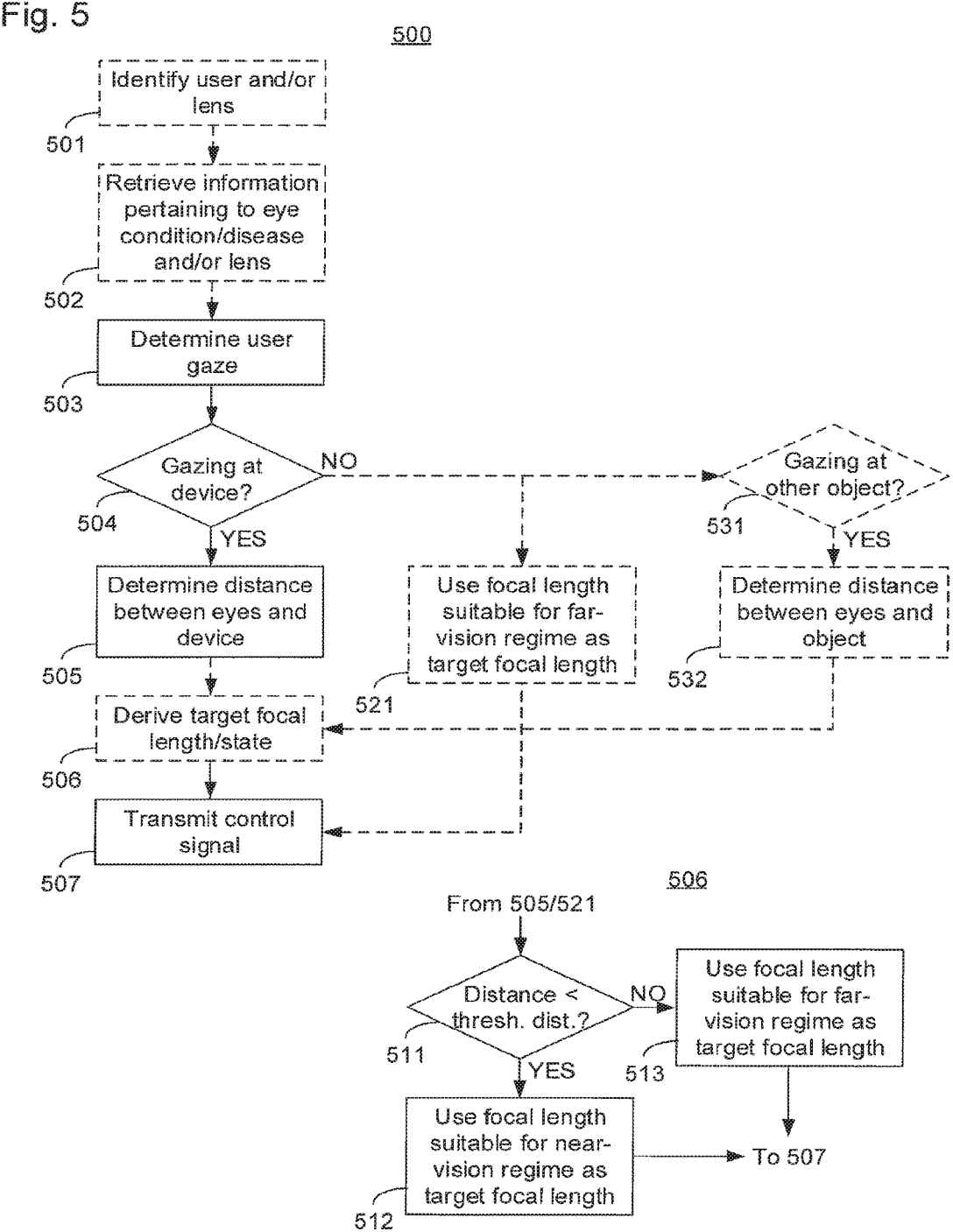
FIG. 5 illustrates a method of controlling a lens for adjustable vision correction, in accordance with embodiments of the invention.

In order to further elucidate the invention, embodiments of the method of a device 120 for controlling at least one lens 151 for adjustable vision correction are now described with reference to FIG. 5. The device may, e.g., be a mobile phone, a smartphone, a mobile terminal, a tablet, an e-book reader, a computer screen, or a television set.

Method 500 comprises determining 503 if the user is gazing at device 120, and if 504 the user is gazing at device 120, determining 505 a distance between eyes 112 and device 120, and controlling 507 lens 151 to adjust its focal length based on the determined distance. Preferably, lens 151 is controlled to adjust its focal length by transmitting 507 a control signal to lens 151. The control signal is either transmitted to lens 151 or glasses 150 comprising the lens, or a lens control unit 153 comprised therein, or to a remote control unit 180 which is operative to control lens 151. The control signal may comprise information representative of at least one of the determined distance, a target focal length which may optionally be derived 506, and a target state of at least two states of lens 151 which may optionally be derived 506, wherein the at least two states have different focal lengths.

Optionally, lens 151 is controlled to adjust its focal length further based on information pertaining to an eye disease or an eye condition of user 110. Such information may, e.g., be retrieved 502 from lens 151, or from a database. Method 500 may optionally comprise identifying 501 user 110 and/or lens 151.

The target focal length or target state may, e.g., be derived 506 by comparing 511 the determined distance to a threshold distance which is representative of a transition between a near-vision regime and a far-vision regime of eye(s) 112, wherein lens 151 is controlled to adjust its focal length to a focal length suitable for the near-vision regime 512 if the determined distance is below 511 the threshold distance. Optionally, lens 151 is controlled to adjust its focal length to a focal length suitable for the far-vision regime 513 if the determined distance is equal to or above 511 the threshold distance.

Optionally, if user 112 if it is determined 504 that user 110 is not gazing at device 120, method 500 may further comprise controlling the at least one lens to adjust its focal length to a focal length suitable for a far-vision regime 521 of eye(s) 112.

The distance between eyes 112 and device 120 may, e.g., be determined by detecting that device 120 is held and/or operated by a hand 111 of user 110, and determining the distance based on an anatomy of user 110.

Optionally, it may be determined 504 that user 110 is gazing at device 120 if device 120 is operated by a hand 111 of user 110.

Further, method 500 may optionally comprise, if the user is not gazing 504 at device 120, determining 531 an object in the surroundings of device 120 at which user 110 is gazing, determining 532 a distance between eyes 112 and the object, and controlling 507 lens 151 to adjust its focal length based on the determined distance.

Method 500 may further comprise additional or alternative steps in accordance with embodiments of the invention described throughout this disclosure, in particular with reference to FIGS. 1 to 4.

Figure 6:
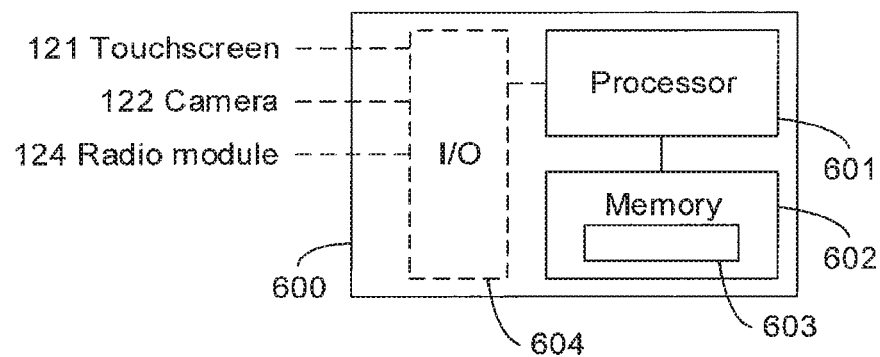
FIG. 6 shows a processing module for a device for controlling a lens for adjustable vision correction, in accordance with embodiments of the invention.

In FIG. 6, an embodiment 600 of processing module 123 comprised in device 120 is shown. Processing module 600 comprises a processing unit 601, such as a general purpose processor, and a memory 602. Memory 602 comprises computer-executable instructions 603. Processing module 600 may optionally comprise one or more interfaces 604 ("I/O" in FIG. 6) for communicating with touchscreen 121, camera 122, and radio module 124, in accordance with what is described hereinbefore. When executed on processor 601, computer-executable instructions cause device 120 to perform an embodiment of the invention, in particular an embodiment of method 500 described with reference to FIG. 5. More specifically, device 120 becomes operative to determine if user 110 is gazing at device 120, and if user 110 is gazing at device 120, determine a distance between eyes 112 and device 120, and control lens 151 to adjust its focal length based on the determined distance. In addition, device 120 may become operative to perform additional or alternative functionality described throughout this disclosure.

Figure 7:
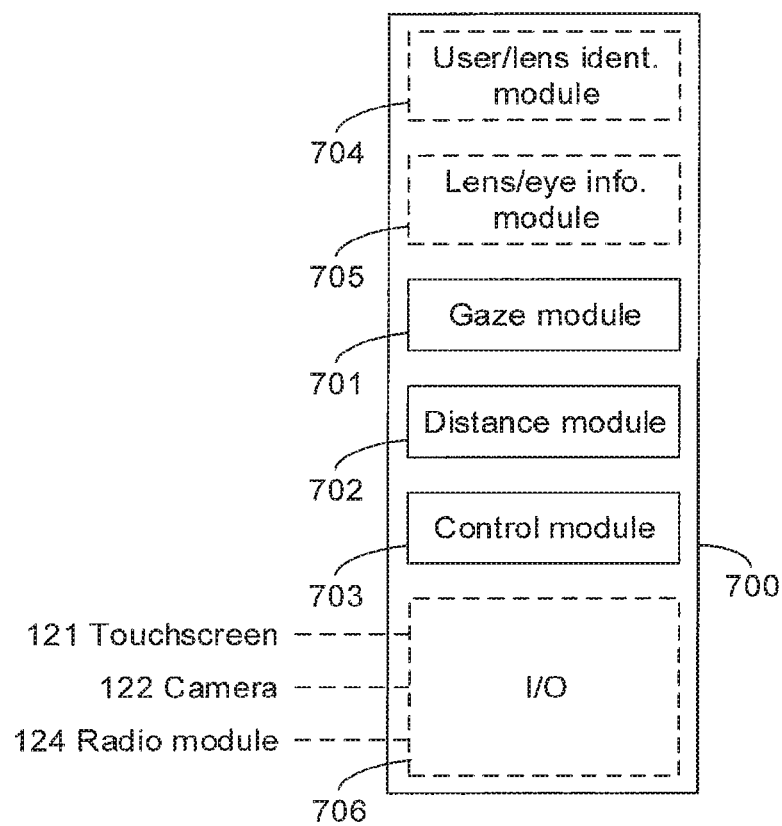
FIG. 7 shows a processing module for a device for controlling a lens for adjustable vision correction, in accordance with other embodiments of the invention.

An alternative embodiment 700 of processing module 123 is shown in FIG. 7. Processing module 700 comprises a gaze module 701 for determining if user 110 is gazing at device 120, a distance module 702 for determining, if user 110 is gazing at device 120, a distance between eyes 112 and device 120, and a control module 703 for control lens 151 to adjust its focal length based on the determined distance. Processing module 700 may comprise additional or alternative modules which are operative to implement functionality described throughout this disclosure, e.g., a user/lens identification module 704 for identifying user 110 and/or lens 151, and/or a lens/eye information module 705 for providing information pertaining to an eye disease or an eye condition of user 110 and/or optical properties of lens 151.

Embodiments of the device for controlling at least one lens for adjustable vision correction, and in particular embodiments of processing module 600 or 700, may be implemented by means of any suitable combination of software, executed on a processor, or hardware, such as analog or digital electronics, Integrated Circuits (ICs), Application Specific ICs (ASICs), and the like. It will be appreciated that the specific functional modules illustrated in FIGS. 6 and 7 only serve as examples, and embodiments of the device and the processing module may use any suitable combination of functional modules other than those described herein and illustrated in FIGS. 6 and 7.

The person skilled in the art realizes that the invention by no means is limited to the embodiments described above. On the contrary, many modifications and variations are possible within the scope of the appended claims.

The invention claimed is:

1. A device for detecting presbyopia of a user of the device, the device being configured to:
    determine if the user is gazing at the device, and
    responsive to determining the user is gazing at the device:
        detect a distance between an eye and the device; and
        determine a threshold distance which is representative of a transition between a near-vision regime and a far-vision regime of the eye, based on the detected distance; and
    upon detecting that the threshold distance increases over time, determine that the user is likely to suffer from presbyopia.

2. The device according to claim 1 further configured to learn the threshold distance by detecting a distance at which the user is holding the device away from the user when reading text.

3. The device according to claim 2 further configured to:
    detect that the device is held at an increased distance from the eye when text with a smaller font size is displayed on a display of the device; and determine that the user suffers from presbyopia based on detecting that the distance gradually increase over time.

4. The device according to claim 3 further configured to notify the user that the user is likely to suffer from presbyopia.

5. The device according to claim 1 further configured to control a focal length of at least one lens positioned between a display of the device and an eye of the user to provide adjustable vision correction, based on the detected distance.

6. The device according to claim 5 further configured to compare the detected distance to the threshold distance, wherein the at least one lens is controlled to adjust the focal length for near-vision compensation responsive to the detected distance being below the threshold distance, and to adjust the focal length for far-vision compensation responsive to the detected distance being equal to or above the threshold distance.

7. The device according to claim 5 further configured to, responsive to determining that the user's eye is not gazing at the device, control the at least one lens to adjust the focal length for far-vision compensation.

8. The device according to claim 5, wherein the at least one lens comprises an electro-active lens that is part of glasses and/or a contact lens that is wearable by the user, and the electro-active lens is controlled by the device to adjust the focal length.

9. The device according to claim 8, wherein the device communicates with a lens control circuit that is electrically connected to the electro-active lens to control the focal length of the lens responsive to a control signal from the device.

10. The device according to claim 1, wherein the device is a mobile phone, a smartphone, a mobile terminal, a tablet, an e-book reader, a computer screen, or a television set.

11. A method of a device for detecting presbyopia of a user of the device, the method comprising:
determining if the user is gazing at the device, and
responsive to determining the user is gazing at the device:
detecting a distance between an eye and the device; and
determining a threshold distance which is representative of a transition between a near-vision regime and a far-vision regime of the eye, based on the detected distance; and
upon detecting that the threshold distance increases over time, determining that the user is likely to suffer from presbyopia.

12. The method according to claim 11, further comprising learning the threshold distance by detecting a distance at which the user is holding the device away from the user when reading text.

13. The method according to claim 12, further comprising:
detecting that the device is held at an increased distance from the eye when text with a smaller font size is displayed on a display of the device; and
determining that the user suffers from presbyopia based on detecting that the distance gradually increase over time.

14. The method according to claim 11, further comprising notifying the user that they are likely to suffer from presbyopia.

15. The method according to claim 11, further comprising controlling a focal length of at least one lens positioned between a display of the device and an eye of the user to provide adjustable vision correction, based on the detected distance.

16. The method according to claim 15, further comprising:
comparing the detected distance to the threshold distance, wherein the at least one lens is controlled to adjust the focal length for near-vision compensation responsive to the detected distance being below the threshold distance, and to adjust the focal length for far-vision compensation responsive to the detected distance being equal to or above the threshold distance.

17. The method according to claim 15, further comprising:
responsive to determining that the user's eye is not gazing at the device, control the at least one lens to adjust the focal length for far-vision compensation.

18. The method according to claim 15, wherein the at least one lens comprises an electro-active lens that is part of glasses and/or a contact lens that is wearable by the user, and the electro-active lens is controlled by the device to adjust the focal length.

19. The method according to claim 18, further comprising:
communicating a control signal to a lens control circuit that is electrically connected to the electro-active lens to control the focal length of the lens.

20. A computer program product comprising a non-transitory computer-readable medium storing computer instructions that when executed by a processor of a device cause the processor to perform operations comprising:
determining if a user is gazing at the device, and
responsive to determining the user is gazing at the device:
detecting a distance between an eye and the device; and
determining a threshold distance which is representative of a transition between a near-vision regime and a far-vision regime of the eye, based on the detected distance; and
upon detecting that the threshold distance increases over time, determining that the user is likely to suffer from presbyopia.

* * * * *